Jan. 21, 1958

C. E. COY 2,820,929

TRANSISTOR HOLDERS

Filed Oct. 11, 1955

INVENTOR.
CARL E. COY

BY

G. D. O'Brien
H. W. Loscke
ATTYS.

2,820,929

TRANSISTOR HOLDERS

Carl E. Coy, Glen Burnie, Md., assignor to the United States of America as represented by the Secretary of the Navy Application October 11, 1955, Serial No. 539,952

3 Claims. (Cl. 317—234)

(Granted under Title 35, U. S. Code (1952), sec. 266)

The invention described herein may be manufactured and used by or for the Government of the United States of America for governmental purposes without the payment of any royalties thereon or therefor.

The present invention relates to a holding device for transistors and more particularly to a device for holding transistors of the hermetical seal type.

Heretofore, due to the peculiar shape of hermetic seal type transistors, mechanical fasteners were not employed to fasten transistors to chassis or terminal boards. The small wire leads were relied upon to hold the transistor in position, however this method of mounting was most undesirable since there were many broken leads which caused an electrical failure. The slightest shock or vibration would cause movement between the transistor and the chassis or terminal board causing microphonics and many broken connections.

The present invention provides a novel means of mounting a hermetic seal type transistor. A body portion has an internal cavity adaptable for mounting a transistor therein and a threaded portion on the outside for fastening to a chassis or terminal board. A terminal holder, which has terminals adaptable for receiving the lead wires of the transistor, is fitted inside the cavity of the body portion and a cap retains the transistor and terminal spacer in position. The lead wires of the transistor that is mounted within the internal cavity are connected, as by soldering, to the terminals and the assembled unit can be either plugged into a socket or wire can be soldered direct to the terminals.

The transistor holder described herein provides a convenient method of mounting a hermetic seal type transistor and in addition protects the transistor from breakage, as the transistor is completely housed within a casing. Also breakage of lead wires is eliminated as the lead wires are fastened to the inside diameter of the mounted terminals and no strain can be put on them when the unit is plugged in or wired into a circuit. It is therefore a general object of the present invention to provide a holding device for mounting transistors and to provide protection from transistor breakage, and particularly to eliminate lead wire breakage.

Other objects and features of the invention will become apparent to those skilled in the art as the disclosure is made in the following detailed description when considered in connection with the accompanying drawing wherein.

Figures 1, 2, 3, 4:
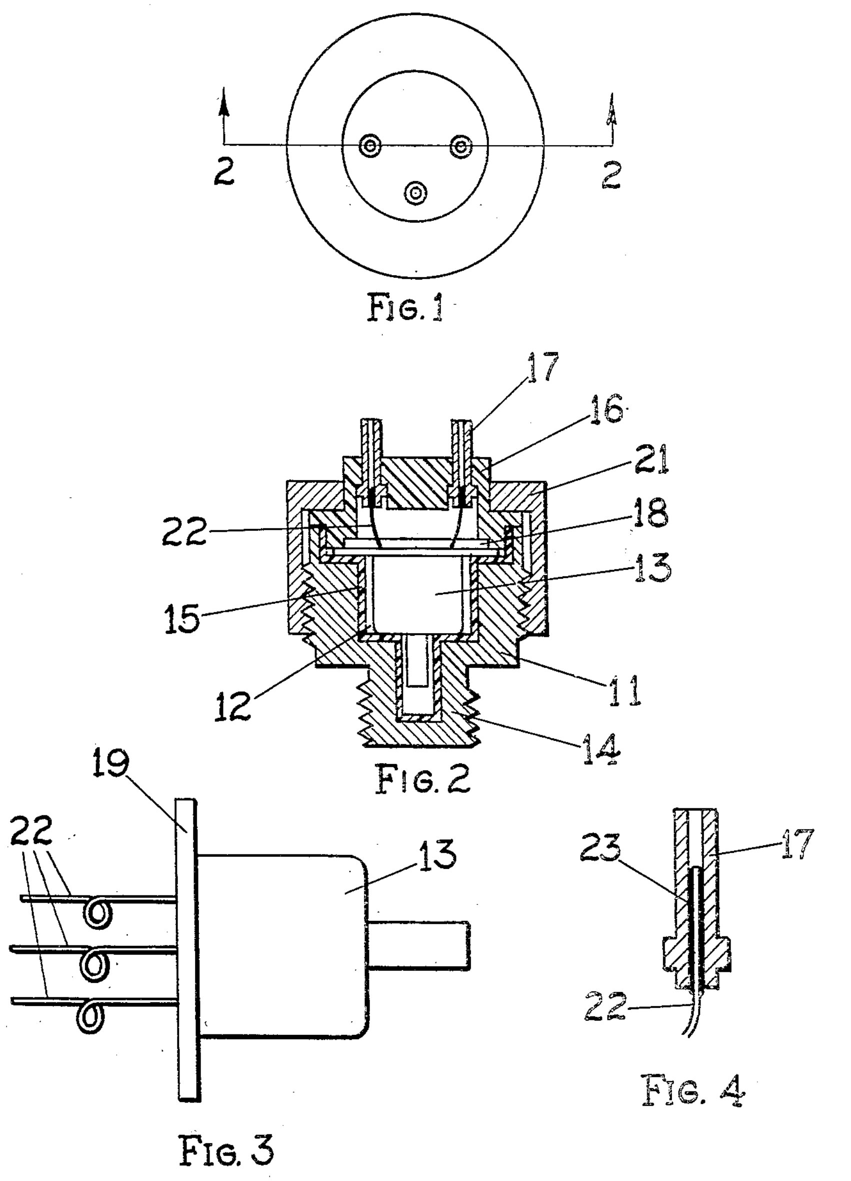
Fig. 1 is a top plan view of the invention.
Fig. 2 is a sectional view taken on line 2—2 of Fig. 1.
Fig. 3 is a side view of a transistor of the kind that is to be mounted.
Fig. 4 is a cross-sectional view of a terminal.

Referring now to the drawing, wherein like reference characters designate like or corresponding parts throughout the several views, there is shown a body 11 that has an internal cavity 12 that is contoured so as to receive a hermetic seal type transistor 13. As shown in Fig. 2 of the drawing, the body 11 has a neck portion 14 that has an external threaded portion that is used to fasten the body to a chassis or terminal board.

In the preferred embodiment of the invention, as shown in Fig. 2 of the drawing, a nylon insert 15 is used to insulate the transistor from the metallic body 11. An insulated terminal holder 16, which is made of an electrically non-conductive material such as nylon, holds a plurality of terminals 17. The terminal holder 16 is fitted within the internal cavity 12 and a flange 18 on the terminal holder 16 bears against the terminal holder 16 to maintain the terminal holder in position.

As shown in Figs. 2 and 4 of the drawing, the lead wires 22 of the transistor 13 are inserted within the bore of the terminals 17 and a quantity of solder 23 is flowed inside the terminals and secures the lead wires 22 therein. When it is desired to place the transistor 13 in an electronic circuit, the terminals 17 can be plugged into a socket, or lead wires can be soldered direct to the terminals 17 and thus it can be seen that breakage of the small diameter lead wires 22 will be eliminated.

In the preferred embodiment of the invention the body 11 is metallic and a nylon insert 15 is used to insulate the transistor 13 from the body 11. However it should be understood that the body 11 might readily be made of any electrically non-conducting material and the nylon insert 15 can then be eliminated.

In assembling the complete unit, the neck portion 14 might be threaded to a chassis or terminal board prior to inserting the transistor 13, or the completely assembled unit could be threaded to a chassis or terminal board. However, in the preferred method of assembly, the terminals 17 are assembled in the terminal holder 16 and then the lead wires 22 of the transistor 13 are soldered inside the bore of the terminals 17. Terminal holder 16 and the transistor 13 can then be placed in the body 11 and the cap 21 is next threaded on the body 11 until the cap 21 engages with the top of the terminal holder 16. When the cap 21 is tightened against the terminal holder 16, the flange 18 of the terminal holder presses against the flange 19 of the transistor 13, and thus it can be seen that the transistor 13 is held firmly in position.

Obviously many modifications and variations of the present invention are possible in the light of the above teachings. It is therefore to be understood that the invention may be practiced otherwise than as specifically described.

What is claimed is:

1. A mounting device for a transistor comprising; a body having an internal cavity adaptable for receiving a transistor, said body having mounting means on one end thereof for mounting said device to a chassis; a terminal holder having a plurality of terminals adaptable to receive lead wires of a transistor mounted in said internal cavity; and a cap threadedly connectable to said body and adaptable to retain said terminal holder and said transistor within said internal cavity.

2. A mounting device for a transistor comprising; a metallic body having an internal cavity adaptable for receiving a transistor, said body having a threaded neck portion on one end thereof for mounting said device to a chassis; an insert of electrically non-conducting material disposed within said internal cavity for insulating a transistor from said metallic body; a terminal holder having a plurality of terminals adaptable to receive lead wires of a transistor mounted in said internal cavity; and a cap threadedly connectable to said body and adaptable to retain said terminal holder and said transistor within said internal cavity.

3. A mounting device for a transistor comprising; a body having an internal cavity adaptable for receiving a transistor, said body having a threaded neck portion on one end thereof for mounting said device to a chassis;

a terminal holder of electrically non-conducting material disposed within said internal cavity; a plurality of terminals attached to said terminal holder, each said terminal having a bore therein for inserting lead wires of a transistor disposed within said cavity; and a cap threadedly connectable to said body and adaptable to retain said terminal holder and said transistor within said internal cavity.

References Cited in the file of this patent

UNITED STATES PATENTS

| | | |
|---|---|---|
| 1,671,247 | Levy | May 29, 1928 |
| 2,197,115 | Randolph et al. | Apr. 16, 1940 |